(12) United States Patent
Campbell

(10) Patent No.: US 6,865,946 B2
(45) Date of Patent: Mar. 15, 2005

(54) FLEXURE PLATE DUAL CAPACITANCE ACCELEROMETER

(75) Inventor: Ray Franklin Campbell, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 7 days.

(21) Appl. No.: 10/345,529

(22) Filed: Jan. 16, 2003

(65) Prior Publication Data

US 2004/0139800 A1 Jul. 22, 2004

(51) Int. Cl.[7] ............................................. G01P 15/125
(52) U.S. Cl. ................................................. 73/513.32
(58) Field of Search ........................ 73/514.32, 514.36, 73/514.29, 514.18, 514.15, 514.38

(56) References Cited

U.S. PATENT DOCUMENTS

| | | | |
|---|---|---|---|
| 4,987,779 A | * | 1/1991 | McBrien .................. 73/514.18 |
| 5,801,309 A | * | 9/1998 | Carr et al. ................ 73/514.29 |
| 2002/0190607 A1 | * | 12/2002 | Paden et al. ................. 310/328 |
| 2003/0079543 A1 | * | 5/2003 | Potter ....................... 73/514.32 |

FOREIGN PATENT DOCUMENTS

| | | | | |
|---|---|---|---|---|
| EP | 585862 A1 | * | 3/1994 | ........... G01P/15/08 |
| JP | 06082469 A | * | 3/1994 | ........... G01P/15/02 |

* cited by examiner

Primary Examiner—Hezron Williams
Assistant Examiner—Tamiko Bellamy
(74) Attorney, Agent, or Firm—Artz & Artz, PC

(57) ABSTRACT

A flexure plate dual capacitance accelerometer system includes a flexure plate fixed having edges fixed to a housing structure. A first fixed plate is coupled to the housing structure a distance from one side of the flexure plate. A second fixed plate is coupled to the housing structure a distance from the other side of the flexure plate and disposed substantially parallel with the first fixed plate. The two fixed plates and the flexure plate form dual capacitors, one on each side of the flexure plate. The flexure plate flexes in response to acceleration, thereby altering the two distances and generating phase shift capacitance signals from the dual capacitors.

20 Claims, 4 Drawing Sheets

FLEXURE PLATE DUAL CAPACITANCE ACCELEROMETER

TECHNICAL FIELD

The present invention relates generally to capacitive accelerometers, and more particularly, to a flexure plate dual capacitance accelerometer.

BACKGROUND ART

It is well known that capacitive accelerometers measure the acceleration, vibration and the inclination of objects to which they are attached. These objects typically include missiles, spacecraft, airplanes and automobiles.

In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

This type of accelerometer can be used in a missile or in a portion of aircraft or spacecraft navigation or guidance systems. Accordingly, the temperature in the operating environment of the accelerometer changes over a wide range. Consequently, acceleration must be measured with a high accuracy over a wide range of temperatures. This is often a difficult and inefficient process.

The disadvantages associated with current capacitive accelerometer systems have made it apparent that a new capacitive accelerometer is needed. The new accelerometer should substantially minimize temperature sensing requirements and should also improve acceleration detection accuracy. The present invention is directed to these ends.

SUMMARY OF THE INVENTION

In accordance with one aspect of the present invention, a flexure plate dual capacitance accelerometer system includes a housing structure and a flexure plate. The flexure plate includes a first side, a second side and a common edge. The edge of the first and second side is coupled to the housing. A first fixed plate is coupled to the housing a first distance from the first side of the flexure plate. A second fixed plate is coupled to the housing a second distance from the second side of the flexure plate and is disposed substantially parallel with the first fixed plate. The flexure plate is adapted to flex, thereby altering the first distance and the second distance. A first phase shift capacitance signal is generated in response to changes in the first distance and a second phase shift capacitance signal is generated in response to changes in the second distance.

In accordance with another aspect of the present invention, a method for operating a flexure plate dual capacitance accelerometer system includes accelerating the flexure plate, thereby causing a first distance between the flexure plate and a first fixed plate to change and thereby causing a second distance between the flexure plate and a second fixed plate to change. A first variable capacitor signal is generated, and a first oscillator signal is generated in response to the first variable capacitor signal. A second variable capacitor signal is generated, and a second oscillator signal is generated in response to the second variable capacitor signal. A difference of the first oscillator signal and the second oscillator signal is linearized, and a linearized signal is generated therefrom.

One advantage of the present invention is that it improves accuracy regarding measurement of acceleration. Another advantage is that it is not substantially affected by changes in temperature or temperature gradients.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to an aeronautical system including a flexure plate dual capacitance accelerometer (FPDCA), particularly suited to the aeronautical field. The present invention is, however, applicable to various other uses that may require FPDCAs, such as any system requiring position and velocity measurements under extreme conditions, as will be understood by one skilled in the art.

Figure 1:
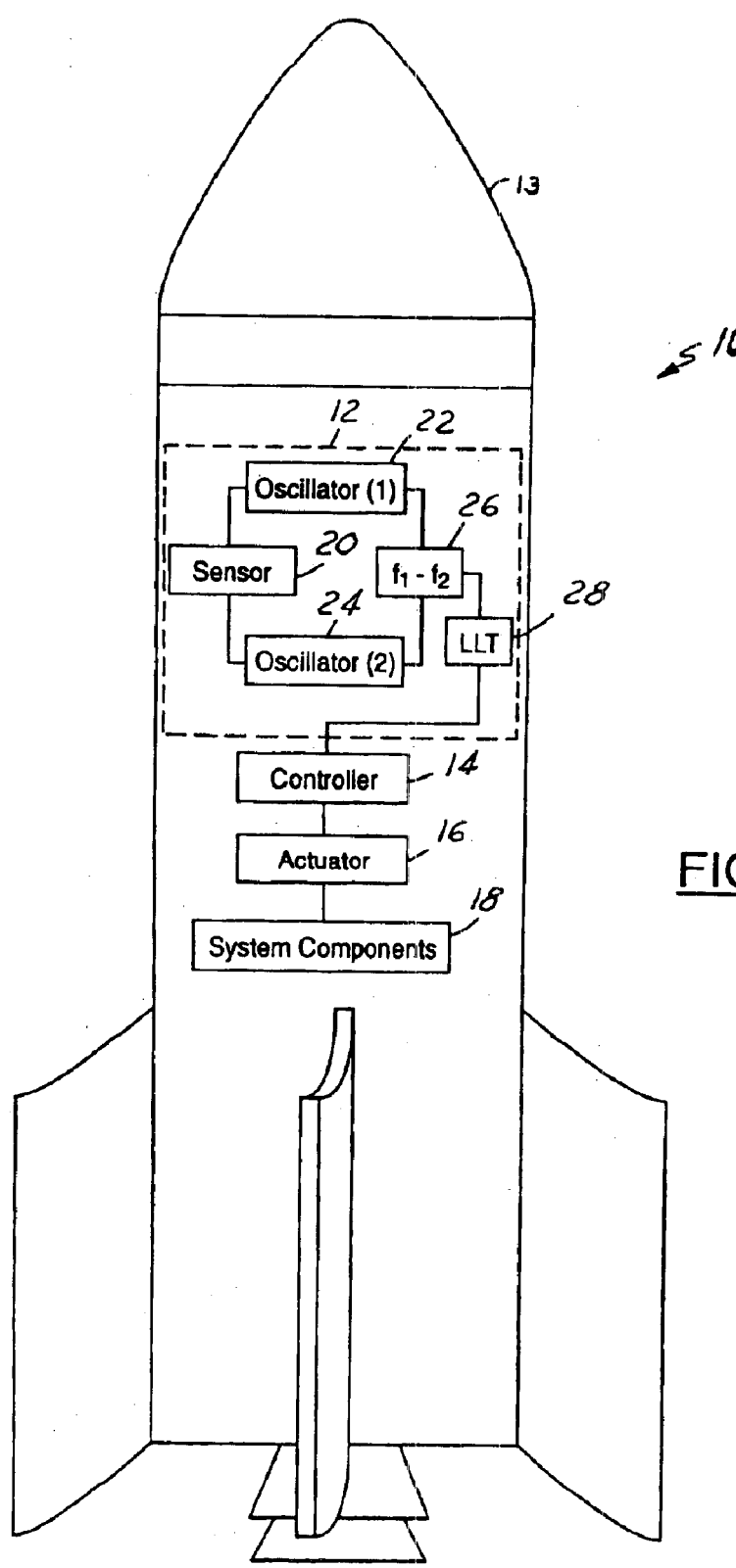
FIG. 1 illustrates an aeronautical system including a flexure plate dual capacitance accelerometer (FPDCA) system in accordance with one embodiment of the present invention.
Figure 2:
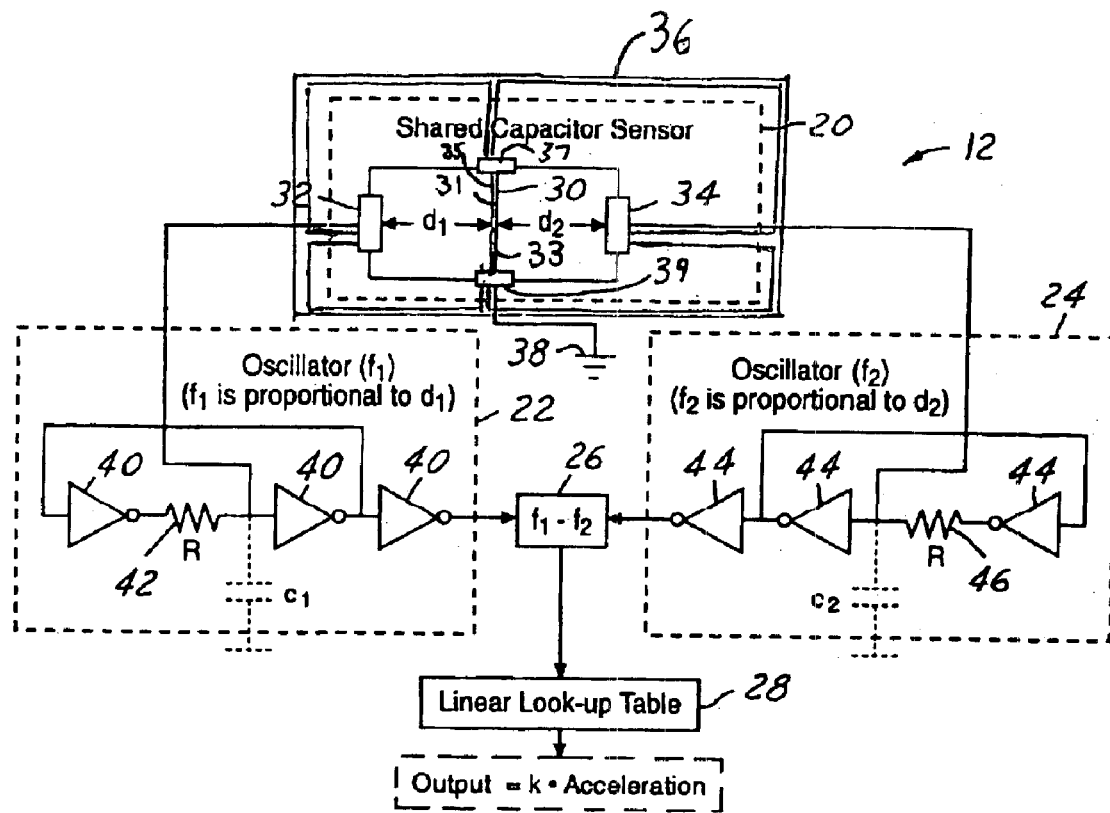
FIG. 2 illustrates the FPDCA system of FIG. 1.

Referring to FIGS. 1 and 2, the aeronautical system 10, including the FPDCA 12, is illustrated. The aeronautical system 10 is merely an illustrative example of an accelerating object and not meant to be limiting. For example, the present FPDCA 12 could be implemented in any accelerating object to sense acceleration forces, including any type of vehicles. The FPDCA 12 is included in a missile 13, however, one skilled in the art will realize that the FPDCA 12 can be included in numerous alternate missile systems.

The aeronautical system 10 also includes a controller 14 or computer/processor coupled to the FPDCA 12, an actuator 16 coupled to the controller 14, and aeronautical system components 18 coupled to the actuator 16. These components will be discussed in detail later.

The FPDCA 12 is a single axis accelerometer that provides a wide dynamic range of performance. The FPDCA 12 includes a shared capacitor sensor 20, two oscillators 22, 24, a frequency subtraction device 26, and a Linear Lookup Table (LLT) or linearizer 28.

The shared capacitor sensor 20 includes a single flexure plate 30, two parallel fixed plates 32, 34, and a metal housing structure 36. The shared capacitor sensor 20 generates phase shift capacitance signals in response to acceleration of the aeronautical system 10, as will be discussed later.

The flexure plate 30 is positioned between the two fixed plates 32, 34 such that the first fixed 32 plate is a first distance ($d_1$) from a first side 31 and the second fixed plate 34 is a second distance ($d_2$) from a second side 33 of the flexure plate 30. The flexure plate 30 is affixed to the metal housing structure 36 through at least a portion of at least one edge 37 of the flexure plate 30, which is coupled to both ends of the flexure plate 30 and is also coupled to a ground 38. The present invention, however, includes the flexure plate 30 coupled at two edges 37, 39 for a square embodiment of the plate 30.

In the present embodiment, the flexure plate 30 is circular and coupled to the housing 36 at only one edge 37. However, numerous other shapes are included, as will be understood by one skilled in the art. The flexure plate includes a first side 31, a second side 37 and a common edge 35. The flexure plate is rigidly fixed to the metal housing structure through almost any manner known in the art. Resultantly, all the system flexure is generated within the flexure plate 30. This generally increases reliability and robustness of the system 10. This, however, generates a non-linear output from the flexure plate 30, which will be discussed regarding the linear lookup table linearizer 28.

A gas or vacuum environment is enclosed within the sensor 20 through the metal housing structure 36 such that there is no interference with the movement of the flexure plate 30 other than the acceleration of the system 10 along a perpendicular axis. During acceleration, the flexure plate 30 flexes according to the reaction force of Newton's second law of motion, force=mass×acceleration (F=ma), causing the distance between the flexure plate 30 and the fixed plates 32, 34 to vary, thus creating the two variable capacitors, one on each side of the flexure plate 30.

The combination of the first fixed plate 32 and the flexure plate 30 forms a first parallel plate capacitor, and the combination of the second fixed plate 34 and the flexure plate 30 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $C \equiv (\epsilon_0 A)/d$, where $\epsilon_0$ is the permittivity constant, A is the area of a fixed plate 32 or 34 (if 1 is the length of one side and the cross section of the plate is square, then $A=1^2$) and d is the effective distance between the flexure plate 30 and one of the fixed plates 32, 34.

The first fixed plate 32 is coupled to the metal housing structure 36 and positioned a first distance ($d_1$) from the flexure plate 30. The first fixed plate 32 and the flexure plate 30 form a first capacitor whose operation is also governed by the equation $C \equiv (\epsilon_0 A)/d$. The first fixed plate 32 responds to movement of the flexure plate 30 when $d_1$ either increases or decreases, thereby generating a first phase shift capacitance signal.

The second fixed plate 34 is also coupled to the metal housing structure 36 and positioned a first distance ($d_1$) from the flexure plate 30. The second fixed plate 34 and the flexure plate 30 form a second capacitor whose operation is governed by the equation $C \equiv (\epsilon_0 A)/d$. The second fixed plate 34 responds to movement of the flexure plate 30 when $d_2$ either increases or decreases, thereby generating a second phase shift capacitance signal.

The distances ($d_1$ and $d_2$) between the flexure plate 30 and the fixed plates 32, 34 are a function of acceleration and are proportional or equal when the system 10 is at rest. Each fixed plate 32, 34 is connected to a respective oscillator 22, 24, which generates the phase shift capacitance necessary for predictable oscillation.

The first fixed plate 32 is coupled to the first oscillator 22, and the second fixed plate 34 is coupled to the second oscillator 24. The two oscillators 22, 24 are coupled to a frequency subtraction device 26, and the frequency subtraction device 26 is coupled to the LLT 28, which is coupled to a system controller 14 (missile operations controller). The system controller 14 is coupled to an actuator 16, which is coupled to various system components 18, such as thrusters and attitude control devices.

The oscillators 22, 24 are ideally precision designs utilizing GaAs or similar material. The oscillators 22, 24 are also mounted on the metal housing structure 36 in the present embodiment.

The embodied first oscillator 22 includes components well known in the art. Although the embodied oscillator is a common oscillator type, one skilled in the art will realize that numerous other types of oscillators will also be adaptable for the present invention. The various components include, but are not limited to, three inverters 40 and a least one resistor 42. The first oscillator 22 receives the phase shift capacitance signal from the first fixed plate 32 and generates therefrom a frequency signal ($f_1$), which is proportional to $d_1$.

The second oscillator 24 receives the phase shift capacitance signal from the second fixed plate capacitor and generates therefrom a second frequency signal ($f_2$), which is proportional to $d_2$. The embodied oscillator 24 is similar to the first oscillator 22 and also includes a set of inverters 44 and at least one resistor 46.

The frequencies ($f_1$ and $f_2$) are functions of the distances ($d_1$ and $d_2$) respectively. As the flexure plate 30 flexes, one capacitor increases and the other decreases, thereby causing one oscillator 22 to increase output frequency and the other oscillator 24 to decrease output frequency.

The frequency subtraction device 26 receives the oscillator signals ($f_1$ and $f_2$) and generates the difference thereof, i.e. $f_1-f_2$. Important to note is that the polarities of both $f_1$ and $f_2$ are determined before this difference is calculated. An overall frequency signal is generated from the frequency subtraction device 26.

A linearizer 28 or LLT receives the overall frequency signal. The linearizer 28 compensates for both the nonlinear function generated from the frequency subtraction device 26 and any manufacturing anomalies, as will be understood by one skilled in the art. The linearizer 28 value is established in manufacturing through taking large samples of performance curves, as will be understood by one skilled in the art. The linearizer 28 output is a digital word whose magnitude is proportional to the acceleration of the system 10 in either direction along an axis perpendicular to the flexure plate 30.

Numerous alternate linearizers are also included in the present embodiment whereby a substantially linear function can be generated by compensating for nonlinear functions, for example, in the digital domain, a digital linearizer is included. The output of the liearizer 28 is an acceleration signal multiplied by a constant (k).

Statistical filtering of the linearized data somewhere significantly above the maximum flexure frequency also occurs in either the linearizer 28 or the controller 14 to reduce the overall noise impact on the system 10.

The controller 14 receives the acceleration signal multiplied by the constant and generates a controller signal and response thereto. The controller 14 is embodied as a typical missile or airplane controller, as is familiar in the art.

The actuator 16 receives the controller signal and activates system components 18 (e.g. object control devices) in response thereto. System components 18 include for example, thrusters or attitude control devices.

Figure 3:
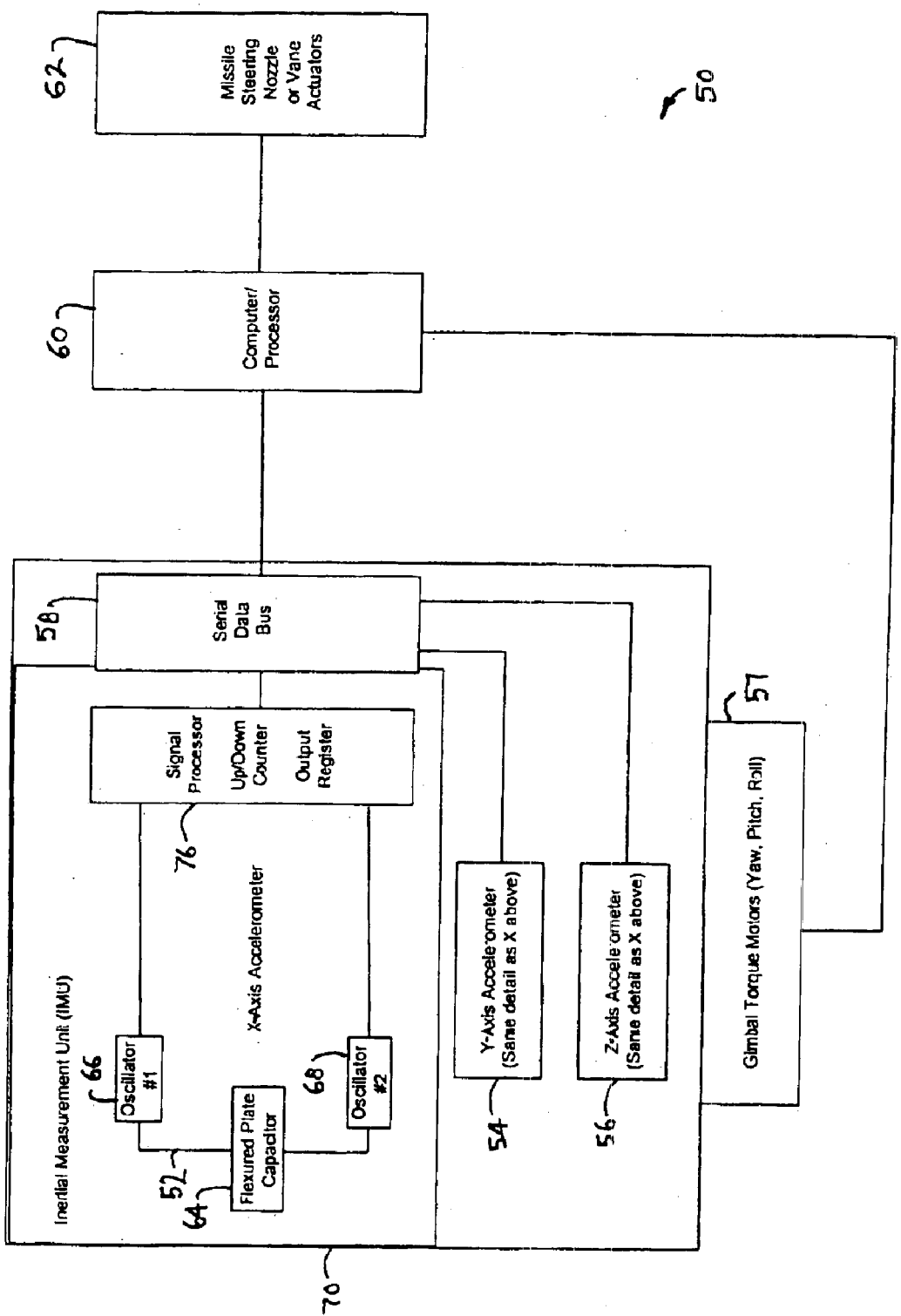
FIG. 3 is an alternate aeronautical system including an FPDCA in accordance with another embodiment of the present invention.

Referring to FIG. 3, an alternate embodiment of FIG. 1, including the Minuteman III missile system 50 having three FPDCAs 52, 54, 56, is illustrated. The three accelerometers, x-axis accelerometer 52, y-axis accelerometer 54, and z-axis accelerometer 56, are coupled to gimbals and gimbal torque motors 57 (yaw, pitch and roll motors). The accelerometers 52, 54, 56 are also coupled to a serial bus 58, which transfers information to a computer/processor 60. The computer 60 is also coupled to the missile steering nozzle (or vane actuators) unit 62 and the gimbal torque motors 57.

The accelerometer 52 will be an illustrative example of the three accelerometers 52, 54, 56 in this embodiment. The accelerometer 52 is part of an inertial measurement unit 70 (IMU) and includes the flexured plate capacitor 64, the two oscillators 66, 68, and a signal processor 76. The accelerometers 52, 54, 56 are an alternative approach to the typical cross axis thrust devices used in Minuteman missiles.

In this embodiment, rather than a frequency subtractor and a LLT, a signal processor 76 has been included to linearize signals from the oscillators 66, 68.

Figure 4:
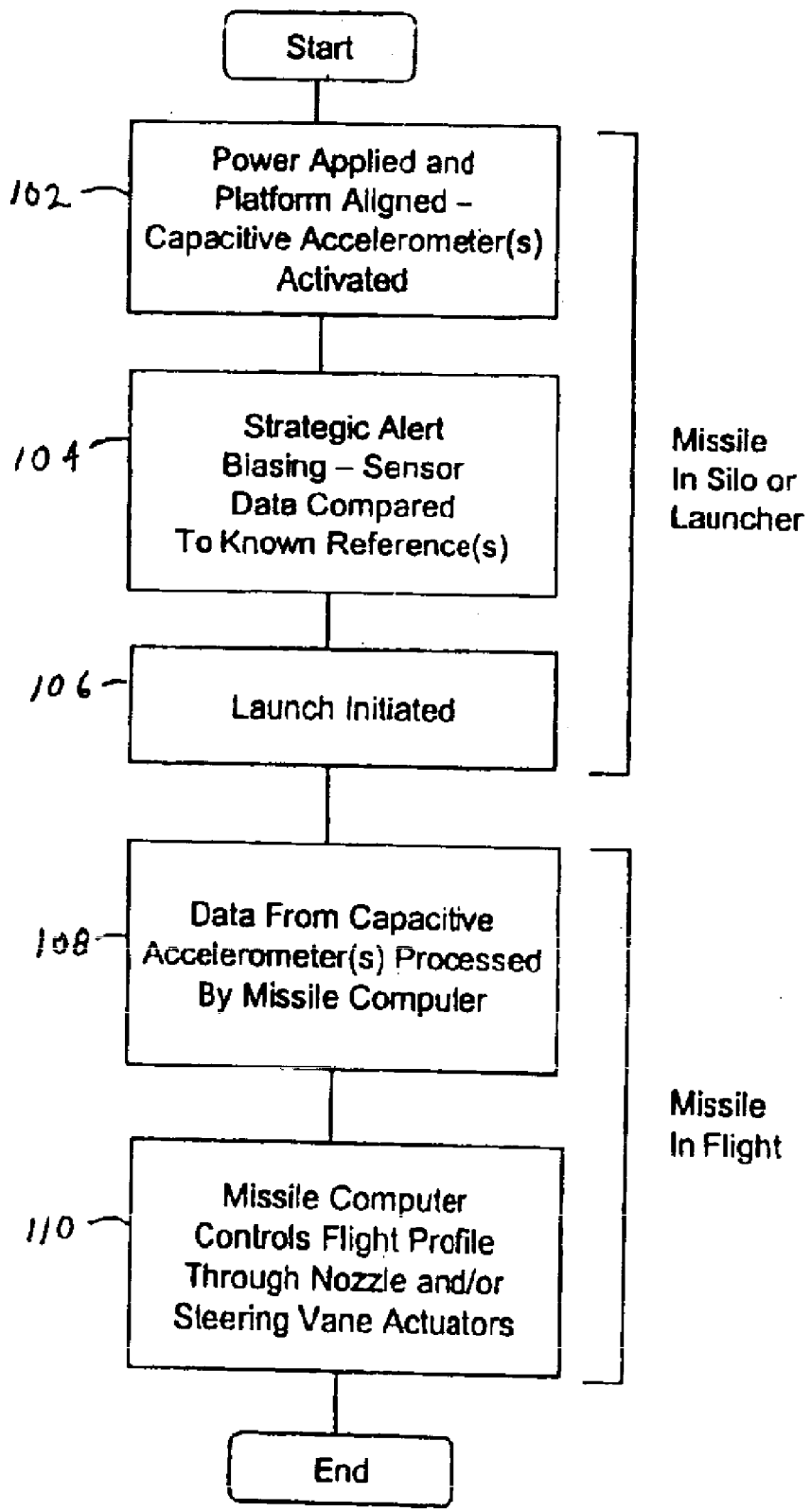
FIG. 4 illustrates a logic flow diagram of the aeronautical system of FIG. 1 in operation, in accordance with another embodiment of the present invention.

Referring to FIG. 4, a logic flow diagram 100 illustrating a method for acceleration control is illustrated. Logic starts in operation block 102 where power is applied to the system, the missile platform is aligned and the capacitive accelerometer is activated.

In operation block 104, strategic alert biasing occurs and sensor data is compared to a known reference.

In operation block 106, the missile is launched.

In operation block 108, the missile accelerates and the flexure plate flexes to either increase or decrease $d_1$ or $d_2$. The oscillator activates and receives signals from the fixed plate capacitors which are generated in response to a change in either $d_1$ or $d_2$. Notably, a change in $d_1$ will resultantly cause a change in $d_2$ as will be understood by one skilled in the art. The oscillators then generate frequency signals in response to the fixed plate capacitor signals. The frequency from the first oscillator is subtracted from the frequency from the second oscillator to generate a nonlinear overall frequency signal. In operation block 108, the overall frequency signal, i.e. the results of the acceleration, are linearized. This linearization is achieved through a linear lookup table, or other linearization methods known in the art. Data from the accelerometer(s) is processed by the missile computer or attitude controller.

In operation block 110, aeronautical systems respond to the acceleration. In other words, the controller receives a signal indicating that acceleration of the system has changed. In response to this change, for example, thrusters are activated to compensate for the acceleration change. In other words, the missile computer/controller/processor controls the flight profile through the missile nozzle or steering vane actuators.

In operation, a method for operating a flexure plate dual capacitance accelerometer system includes accelerating the flexure plate, thereby causing a first distance between the flexure plate and a first fixed plate to change and thereby causing a second distance between the flexure plate and a second fixed plate to change. A first variable capacitor signal is generated, and a first oscillator signal is generated in response to the first variable capacitor signal. A second variable capacitor signal is generated, and a second oscillator signal is generated in response to the second variable capacitor signal. A difference of the first oscillator signal and the second oscillator signal is linearized, and a linearized signal is generated.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A dual capacitance accelerometer comprising:
   a housing;
   a first plate fixed within said housing;
   a second plate fixed within said housing spaced apart from and in parallel relation to said first plate; and
   a flexure plate disposed between and in substantially parallel relation to said first and second plates, said flexure plate coupled to said housing along at least an edge, said flexure plate and first plate defining a first distance and said flexure plate and said second plate defining a second distance, wherein said first and second distances vary in response to acceleration forces acting upon said flexure plate, and wherein said first flexure plate and said fixed plate generate a first capacitance signal, and said second flexure plate and said fixed plate generate a second capacitance signal; and
   a linearizer linearizing a function of said first capacitance signal and said second capacitance signal.

2. The system of claim 1 further comprising a first oscillator adapted to receive said first capacitance signal and generate a first frequency signal in response thereto.

3. The system of claim 2 further comprising a second oscillator adapted to receive said second phase shift capacitance signal and generate a second frequency signal in response thereto; and
   a frequency subtraction device adapted to subtract said second frequency signal from said first frequency signal and generate therefrom said function of said first capacitance signal and said second capacitance signal.

4. A dual capacitance accelerometer comprising:
   a housing;
   a first plate fixed within said housing;
   a second plate fixed within said housing spaced apart from and in parallel relation to said first plate; and
   a flexure plate disposed between and in substantially parallel relation to said first and second plates, said flexure plate coupled to said housing along at least an edge, said flexure plate and first plate defining a first distance and said flexure plate and said second plate defining a second distance,
   wherein said first and second distances vary in response to acceleration forces acting upon said flexure plate, and wherein said first flexure plate and said fixed plate generate a first phase shift capacitance signal, and said second flexure plate and said fixed plate generate a second phase shift capacitance signal;

a first oscillator adapted to receive said first phase shift capacitance signal and generate a first frequency signal in response thereto;

a second oscillator adapted to receive said second phase shift capacitance signal and generate a second frequency signal in response thereto;

a frequency subtraction device adapted to subtract said second frequency signal from said first frequency signal and generate therefrom an overall frequency signal; and a linearizer adapted to receive said overall frequency signal and generate therefrom a linearized acceleration signal.

5. The system of claim 4 wherein said linearizer comprises a linear lookup table.

6. The system of claim 4 further comprising an actuator adapted to activate a system component in response to a system control signal.

7. The system of claim 6 wherein said system component comprises a thruster or an attitude control device.

8. The system of claim 6 further comprising a system controller adapted to receive said linearized acceleration signal and generate a system control signal in response thereto.

9. A method for operating a flexure plate dual capacitance accelerometer system comprising:

accelerating the flexure plate, thereby causing a first distance between the flexure plate and a first fixed plate to change and thereby causing a second distance between the flexure plate and a second fixed plate to change;

generating a first variable capacitor signal;

generating a first oscillator signal in response to said first variable capacitor signal;

generating a second variable capacitor signal;

generating a second oscillator signal in response to said second variable capacitor signal;

linearizing a difference of said first oscillator signal and said second oscillator signal; and generating a linearized signal.

10. The method of claim 9 wherein linearizing said difference further comprises determining polarities of said first oscillator signal and said second oscillator signal.

11. The method of claim 9 further comprising generating a controller signal in response to said linearized signal.

12. The method of claim 11 further comprising activating an object control device in response to said controller signal.

13. The method of claim 9 further comprising filtering said linearized signal.

14. A system for controlling acceleration including an object adapted to accelerate comprising:

a first accelerometer comprising a first shared capacitor sensor comprising a housing, a flexure plate, comprising a first side, a second side and a common edge, said edge coupled to said housing structure, a first fixed plate coupled to said housing at a first distance from said first side of said flexure plate, a second fixed plate coupled to said housing structure a second distance from said second side of said flexure plate and arranged substantially parallel with said first fixed plate, said flexure plate being flexible under acceleration forces wherein said first distance and said second distance vary as a function of said acceleration forces to generate a first phase shift capacitance signal in response to change in said first distance and a second phase shift capacitance signal in response to change in said second distance, a first oscillator adapted to receive said first phase shift capacitance signal and generate a first frequency signal in response thereto, a second oscillator adapted to receive said second phase shift capacitance signal and generate a second frequency signal in response thereto;

a frequency subtraction device adapted to subtract said second frequency signal from said first frequency signal and generate therefrom an overall frequency signal, a linearizer adapted to receive said overall frequency signal and generate therefrom a linearized acceleration signal, an actuator adapted to activate an object control device in response to a system control signal; and a system controller coupled to said first accelerometer and adapted to receive said linearized acceleration signal and generate a system control signal in response thereto.

15. The system of claim 14 wherein said object control device comprises at least one of a thruster, an attitude control device, a missile steering nozzle, or a vane actuator.

16. The system of claim 14 further comprising a filter adapted to filter said linearized signal.

17. The system of claim 14 wherein said linearizer comprises at least one of a linear lookup table, or a signal processor.

18. The system of claim 14 further comprising a second accelerometer and a third accelerometer, wherein said second and third accelerometers are arranged with said first accelerometer to receive cross axis thrust data.

19. The system of claim 18 further comprising a serial data bus adapted to receive acceleration signals from said first, second and third accelerometers, said serial data bus further adapted to exchange information with said system controller.

20. The system of claim 18, wherein said first accelerometer is coupled to a yaw torque motor, said second accelerometer is coupled to a pitch torque motor, and said third accelerometer is coupled to a roll torque motor.

* * * * *

UNITED STATES PATENT AND TRADEMARK OFFICE
CERTIFICATE OF CORRECTION

PATENT NO. : 6,865,946 B2
DATED : March 15, 2005
INVENTOR(S) : Ray Franklin Campbell It is certified that error appears in the above-identified patent and that said Letters Patent is hereby corrected as shown below:

<u>Title page,</u>
Item [56], References Cited, U.S. PATENT DOCUMENTS, add
-- 2,696,566    12/07/1954    Kurt S. Lion    307/52 --.

Signed and Sealed this

Sixth Day of September, 2005

JON W. DUDAS
*Director of the United States Patent and Trademark Office*